(12) United States Patent
Moens et al.

(10) Patent No.: US 11,649,861 B2
(45) Date of Patent: May 16, 2023

(54) DOUBLE CLUTCH UNIT IN A TRANSMISSION

(71) Applicant: TRANSMISIONES Y EQUIPOS MECANICOS, S.A. DE CV, Zedelgem (BE)

(72) Inventors: Ilse Moens, Bruges (BE); Jannick De Landtsheere, Sint-Kruis (BE); Johan Gerard Michel Joseph Vancoillie, Roeselare (BE); Maarten Debrouwere, Zedelgem (BE); Didier Genouw, Eernegem (BE)

(73) Assignee: TRANSMISIONES Y EQUIPOS MECANICOS, S.A. DE CV

( * ) Notice: Subject to any disclaimer, the term of this patent is extended or adjusted under 35 U.S.C. 154(b) by 30 days.

(21) Appl. No.: 17/611,011

(22) PCT Filed: May 13, 2020

(86) PCT No.: PCT/EP2020/063315
§ 371 (c)(1),
(2) Date: Nov. 12, 2021

(87) PCT Pub. No.: WO2020/234082
PCT Pub. Date: Nov. 26, 2020

(65) Prior Publication Data
US 2022/0221009 A1    Jul. 14, 2022

(30) Foreign Application Priority Data

May 17, 2019    (EP) ..................... 19175043

(51) Int. Cl.
*F16D 25/10*    (2006.01)
*F16D 25/0638*    (2006.01)
*F16D 21/06*    (2006.01)

(52) U.S. Cl.
CPC ......... *F16D 25/10* (2013.01); *F16D 25/0638* (2013.01); *F16D 21/06* (2013.01);
(Continued)

(58) Field of Classification Search
CPC .... F16D 25/10; F16D 25/123; F16D 25/0638; F16D 2021/0661; F16D 2300/17; F16D 2300/12; F16D 1/36
See application file for complete search history.

(56) References Cited

U.S. PATENT DOCUMENTS 4,030,575 A *    6/1977    Moring .................. B60T 1/062
                                                              188/170
8,479,906 B2 *    7/2013    Hauck ................. F16D 25/0638
                                                              192/115

(Continued)

FOREIGN PATENT DOCUMENTS

DE    10 2005 045 158    3/2007    ............. F16D 21/02
DE    10 2009 059 928    7/2010    ............. F16D 13/72

(Continued)

OTHER PUBLICATIONS

International Preliminary Report on Patentability issued in PCT/EP2020/063309, dated Nov. 16, 2021, 7 pages.

(Continued)

*Primary Examiner* — Stacey A Fluhart
(74) *Attorney, Agent, or Firm* — Hayes Soloway P.C.

(57) ABSTRACT

A double clutch unit for a transmission, having an outer clutch pack and an inner clutch pack each having a clutch pack input and a clutch pack output, wherein a clutch unit input hub rotationally fixed to the outer clutch pack input side and the inner clutch pack input side, a clutch unit inner output hub attached in fixed rotational relation to the outer clutch pack output side, a clutch unit outer output hub attached in fixed rotational relation to an inner clutch pack output side, and an oil distributor rotationally fixed to the inner clutch pack input side, are axially slidable relative to a stator, and a spring-loaded bolt is attached to the engine side of a clutch unit inner power output shaft maintaining the (Continued)

inner output hub, clutch unit outer output hub and oil distributor in axial alignment with respect to the stator.

20 Claims, 7 Drawing Sheets

(52) U.S. Cl.
 CPC ............... *F16D 2021/0607* (2013.01); *F16D 2021/0661* (2013.01); *F16D 2300/12* (2013.01)

(56) References Cited

U.S. PATENT DOCUMENTS

| | | | |
|---|---|---|---|
| 8,672,109 B2 | 3/2014 | Quartier et al. | ........ F16D 21/06 |
| 2006/0032722 A1* | 2/2006 | Guinter | ............... F16D 25/0638 |
| | | | 192/85.33 |
| 2008/0296119 A1* | 12/2008 | Uchiyama | ............... F16D 13/56 |
| | | | 192/107 R |
| 2018/0313411 A1* | 11/2018 | Satoyoshi | ............. F16H 57/023 |

FOREIGN PATENT DOCUMENTS

| | | | |
|---|---|---|---|
| EP | 1226992 | 7/2002 | ............. B60K 17/02 |
| KR | 20160016659 A * | 2/2016 | ......... F16D 25/0638 |
| WO | WO2018104396 | 6/2018 | ............. F16D 21/06 |

OTHER PUBLICATIONS

International Search Report and Written Opinion issued in PCT/EP2020/063309, dated Jul. 13, 2020, 10 pages.
International Preliminary Report on Patentability issued in PCT/EP2020/063315, dated Nov. 16, 2021, 10 pages.
International Search Report and Written Opinion issued in PCT/EP2020/063315, dated Jul. 13, 2020, 10 pages.

* cited by examiner

DOUBLE CLUTCH UNIT IN A TRANSMISSION

FIELD OF THE INVENTION

Provided is a double clutch unit, in particular a configuration of double clutch unit having compact form and ease of assembly and disassembly.

BACKGROUND TO THE INVENTION

In general, double clutches are used in DCTs (double clutch transmissions) to transfer speed and torque from engine and flywheel to the gearbox. Clutch outputs to the gearbox are two concentric shafts where one is used for the odd gears and one for the even and reverse gears. Both power paths are controlled separately by one of the two clutches in the double clutch. Both clutches are actuated separately by hydraulic pressure and can be open, slipping (with differential speed over the clutch) or closed (no differential speed).

In the prior art double clutch units suffer from wear mechanisms caused by play between the parts of the clutch during operation. In DE 10 2005 045 158 axial forces of a spring-loaded bolt (140) are taken up by clutch outer power output shaft (24) whose axial position is maintained by bearings in the gearbox. These bearing are a source of small axial movements (axial play). Small axial movements of both shafts (22, 24) are transmitted during operation axially through parts (84, 80, 37) which axial movements set up wear mechanisms in both clutch packs (64, 62), and also in the bearing or gaps between axially aligned parts. The clutches are radially supported by the outer power output shaft (24) and inner power output shaft (22). Hence, small radial movements of both shafts (22, 24) are transmitted during operation radially through the oil distributor (66), via carrier plates (62, 70) and to both clutch packs (64, 62), which radial movements set up wear mechanisms in both clutches, and also in the bearing or gaps between axially aligned parts. During operation of vehicle, the clutch packs (64, 72) will want to move forwards and backwards during breaking and acceleration respectively due to inertia. The movement of the clutch packs is to be avoided because it sets up wear mechanisms. The movements by the clutch during operation are not limited by spring bolt (140) because the movement of the clutch packs (64, 72) is governed by axial movements of the outer power output shaft (24) inner power output shaft (22). The axial movements of the outer power output shaft (24) inner power output shaft (22) are governed by radial bearings in the gearbox in which there is axial play.

Space for a double clutch assembly is often limited in a sports car transaxle DCT where the axial packaging space is limited. This axial space is determined by the position of engine and flywheel with respect to the side shafts (wheels) and is an input for the design given by the customer. The limited axial packaging space forces the usage of two concentric clutches of which the inner clutch is used for the even gears (and reverse) and the outer clutch for the odd gears. For the high end sports car application, a multi-plate clutch is used that is actively cooled by forced oil lubrication. The dimensioning of the clutches is dependent on the torque requirements and the thermal loads of the slipping clutches in manoeuvres specified by the customer.

Described herein is a configuration of a double clutch unit that solves problem of wear and of axially limited space within a vehicle, ease of assembly and disassembly.

SUMMARY OF THE INVENTION

In a first aspect, provided herein is a double clutch unit (100) for a transmission, having an engine side (E) and a gearbox (G) side which double clutch unit (100) comprises:
an outer clutch pack (40) and an inner clutch pack (30), each having a clutch pack input (42, 32) and a clutch pack output (44, 34),
a clutch unit input hub (1) having a hollow cylindrical part disposed with an external spline connector for attachment to a power input shaft and a flange part rotationally fixed and attached to the cylindrical part rotationally fixed to the outer clutch pack input side (42) and the inner clutch pack input side (32),
a clutch unit inner output hub (8) having a hollow cylindrical part disposed with an internal spline connector for attachment to an inner power output shaft (80), and a flange part attached in fixed rotational relation to the outer clutch pack output side (44),
a clutch unit outer output hub (17) having a hollow cylindrical part disposed with an internal spline connector for attachment to an outer power output shaft (70), and a flange part attached in fixed rotational relation to an inner clutch pack output side (34),
an oil distributor (9) disposed concentrically between the inner clutch pack (30) and the clutch unit outer output hub (17) and rotationally fixed to the inner clutch pack input side (32),
a stator (60) disposed concentrically between the oil distributor (9) and a central axis of the double clutch unit (100),
wherein:
the clutch unit inner power output shaft (80) and stator (60) are maintained in axially fixed relation,
the clutch unit input hub (1), clutch unit inner output hub (8), the clutch unit outer output hub (17), the oil distributor (9) are axially slidable relative to the stator (60), which axial sliding is constrained by a spring-loaded bolt (62),
the spring-loaded bolt (62):
is attached to the engine side (E) of the clutch unit inner power output shaft (80)
applies an axial force in the gearbox (G) direction to the clutch unit inner output hub (8), that is transmitted in order to the clutch unit outer output hub (17), oil distributor (9) and ultimately to the stator (60), preferably to the hollow cylindrical part thereof (60b), maintaining the inner output hub (8), clutch unit outer output hub (17) and oil distributor (9) in axial alignment with respect to the stator (60).

The double clutch unit (100) may further comprise an oil distributor-stator bearing assembly (86, 88; 54, 86, 88; 19, 54) comprising one or more bearings acting separately or in combination in a radial and axial direction disposed between the oil distributor (9) and the stator (60), which assembly (86, 88; 54, 86, 88; 19, 54) supports axial rotation of the oil distributor (9) on the stator (60) and limits axial movement of the oil distributor (9) relative to the stator (60) in the direction of the gearbox (G).

The oil distributor-stator bearing assembly (86, 88; 54, 86, 88; 19, 54) may comprise one or more thrust bearings (88) configured to axially support rotation and limit movement of the oil distributor (9) relative to the stator (60) in the direction of the gearbox (G), and one or more radial bearings (86, 54) configured to radially support rotation of the oil distributor (60) relative to the stator (60).

A $1^{st}$ bearing (49) (also known as an inner output hub-outer output hub bearing (49)) may be disposed between the flange part of clutch unit inner output hub (8) and the flange part of the clutch unit outer output hub (17), wherein the $1^{st}$ bearing (49) is a thrust bearing, a $2^{nd}$ bearing (39) (also known as an outer output hub-oil distributor bearing (39)) may be disposed between a flange part of the clutch unit outer output hub (17) and an end of oil distributor (9), wherein $2^{nd}$ bearing (39) is a thrust bearing, a $3^{rd}$ bearing (19) (part of the oil distributor-stator bearing assembly (19)) may be disposed between the oil distributor (9) and the stator (60), wherein $3^{rd}$ bearing is an angular contact bearing.

The $3^{rd}$ bearing (19) may be disposed between the oil distributor (9) and the stator (60), and limits axial movement of the oil distributor (9) relative to the stator (60) in the direction of the gearbox (G).

The double clutch unit (100) may be configured such that axial forces generated by the spring loaded bolt (62) are taken up by the oil distributor-stator bearing assembly (86, 88; 54, 86, 88; 19; 19, 54) at the gearbox side (G) of the oil distributor (9).

The double clutch unit (100) may be configured such that axial forces generated by the spring loaded bolt (62) are taken up by the $3^{rd}$ bearing (19) at the engine side (E) of the oil distributor (9).

The stator (60) comprises a hollow cylindrical part (60$b$) disposed a plurality of outer-surface annular channels for passage of oil to the oil distributor and a stator flange (60$a$) rotationally and axially fixed to the end of the hollow cylindrical part (60$b$) at the gearbox side (G), optionally wherein the stator flange (60$a$) has a profile of a circle with a section left out.

The stator flange (60$a$) may extend in a peripheral direction beyond a peripheral edge (61$c$, 61$d$) of the oil distributor (9) only in a portion (61$a$), a flange portion (61$a$), of a circumference of the cylindrical part (60$b$), leaving a portion (61$b$), a non-flange portion (61$b$) of the circumference of the cylindrical part (60$b$) that does not extend beyond a peripheral edge (61$c$, 61$d$) of the oil distributor (9). The flange portion (61$a$) may span across more than 30-95% of the circumference of the cylindrical part (60$b$).

The double clutch unit (100) may be configured such that the axial forces generated by the spring loaded bolt (62) being taken up by the $3^{rd}$ bearing (19) that is an angular contact bearing (19) at the engine side (E) of the oil distributor (9) obviates application of axial forces by the oil distributor (9) on the stator flange (60$a$).

The spring-loaded bolt (62) may comprise a bolt head (62$a$), a shank (62$b$) and a threaded section (62$c$),
  the shank (62$b$) may be positioned in between the bolt head (62$a$) and the threaded section (62$c$),
  a spring (66) may be disposed on the shank (62$b$) constrained by the bolt head (62$a$) at one end and at the other end by an adapter (64) comprising an annular ring disposed on the shank,
  compression forces generated by the spring may be applied to the adapter (64) and from the adapter to the clutch unit inner output hub (8).

The threaded section (62$c$) of the bolt may have a smaller diameter than that of the shank (62$b$) such that the inner power output shaft (80) locks against the shank (62$b$) thereby fixing the compressed height of the spring (66).

Axial force generated by the spring-loaded bolt (62) may be transmitted in a direction from the engine (E) to gearbox (G):
  from spring-loaded bolt (62) to clutch unit inner output hub (8),
  from the flange part of clutch unit inner output hub (8) to the flange part of the clutch unit outer output hub (17) via a $1^{st}$ (thrust) bearing (49),
  from the flange part of the clutch unit outer output hub (17) to the oil distributor (9) via a $2^{nd}$ (thrust) bearing (39), and
  from the oil distributor (9) to the stator (60) via an oil distributor-stator bearing assembly (86, 88; 54, 86, 88; 19; 19, 54) comprising a thrust bearing (88).

Axial force generated by the spring-loaded bolt (62) may be transmitted in a direction from the engine (E) to gearbox (G):
  from spring-loaded bolt (62) to clutch unit inner output hub (8),
  from the flange part of clutch unit inner output hub (8) to the flange part of the clutch unit outer output hub (17) via a $1^{st}$ (thrust) bearing (49),
  from the flange part of the clutch unit outer output hub (17) to the oil distributor (9) via a $2^{nd}$ (thrust) bearing (39), and
  from the oil distributor (9) to the stator (60) via a 3rd (angular contact) bearing (19), optionally via a stop member (21).

The double clutch unit (100) may further comprise a thrust washer (52) attached to the gear box side of the flange part of the clutch unit input hub (1).

In a second aspect provided is a transmission comprising the double clutch unit (100) described herein. In a second aspect provided is a use of a spring loaded bolt (62) for adjustment of axial alignment of a clutch unit inner output hub (8), a clutch unit outer output hub (17), and oil distributor (9) in a double clutch unit (100).

Preferred embodiments of the invention are disclosed in the detailed description and appended claims. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. (Preferred) embodiments of one aspect of the invention are also (preferred) embodiments of all other aspects of the invention.

FIGURE LEGENDS

FIG. 1A shows a schematic illustration of a double clutch unit as described herein. Shown is an axial cross section and the upper half; the lower half is essentially a mirror image. White triangles indicate a direction of power flow. Fine parallel lines indicate a spline connection. An oil distributor-stator bearing assembly comprises a thrust bearing (88) and radial bearing (86).

FIG. 1B is similar to FIG. 1A except the oil distributor-stator bearing assembly comprises an angular contact bearing (19) and radial bearing (54).

FIG. 2A is an axial cross-sectional view of an exemplary double clutch unit as described herein. Shown is an axial cross section, the upper half and a part of the lower half. An oil distributor-stator bearing assembly comprises a thrust bearing (88) and two radial bearings (54, 86).

FIG. 2B is similar to FIG. 2A except the oil distributor-stator bearing assembly comprises an angular contact bearing (19) and radial bearing (54).

FIG. 3A is a detail of the spring load bolt and forces applied thereby within a double clutch unit as described herein. Fine parallel lines indicate a spline connection. The oil distributor-stator bearing assembly comprises a thrust bearing (88) and two radial bearings (54, 86).

DETAILED DESCRIPTION OF INVENTION

Figure 1A:
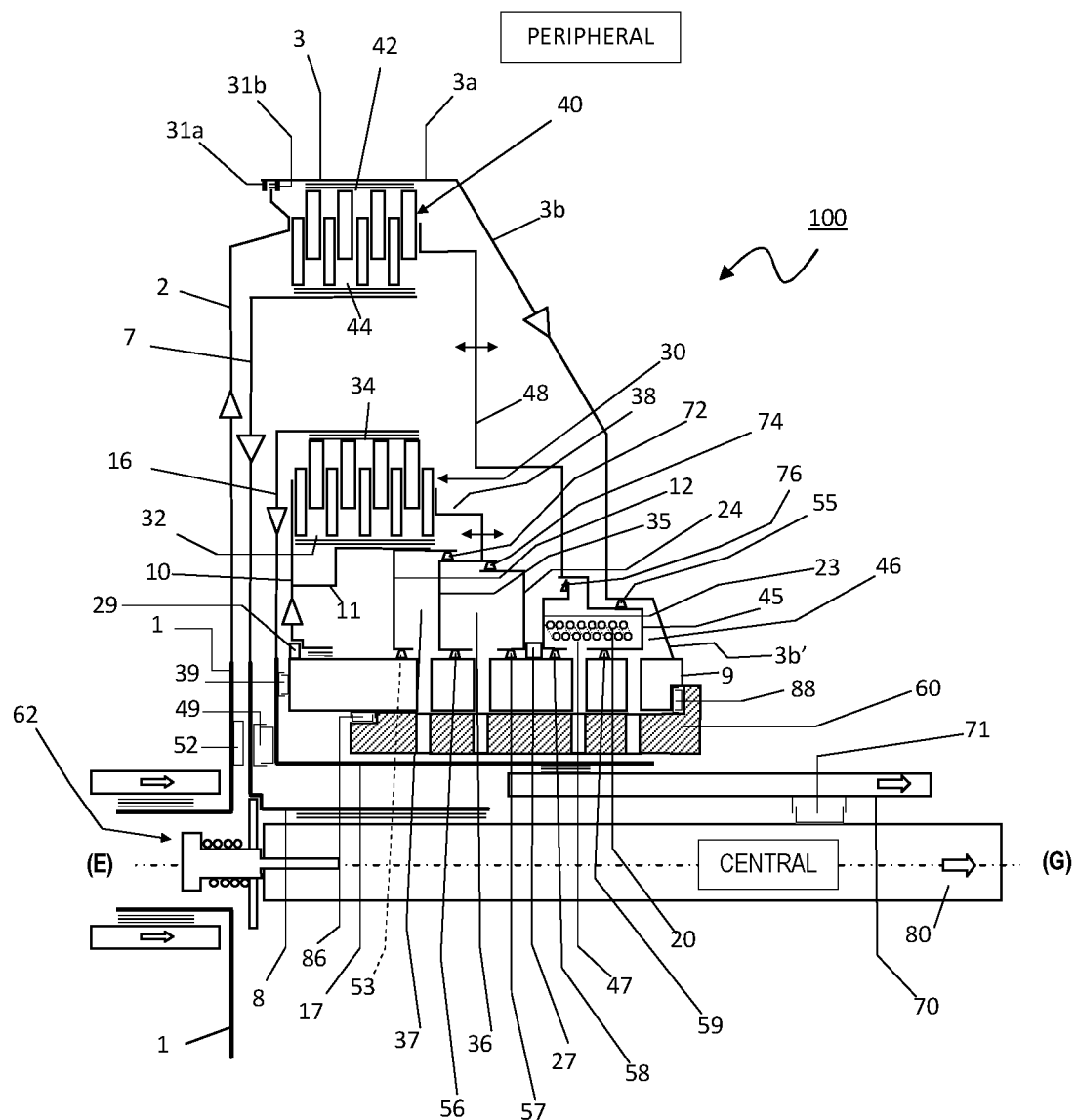
Figure 1B:
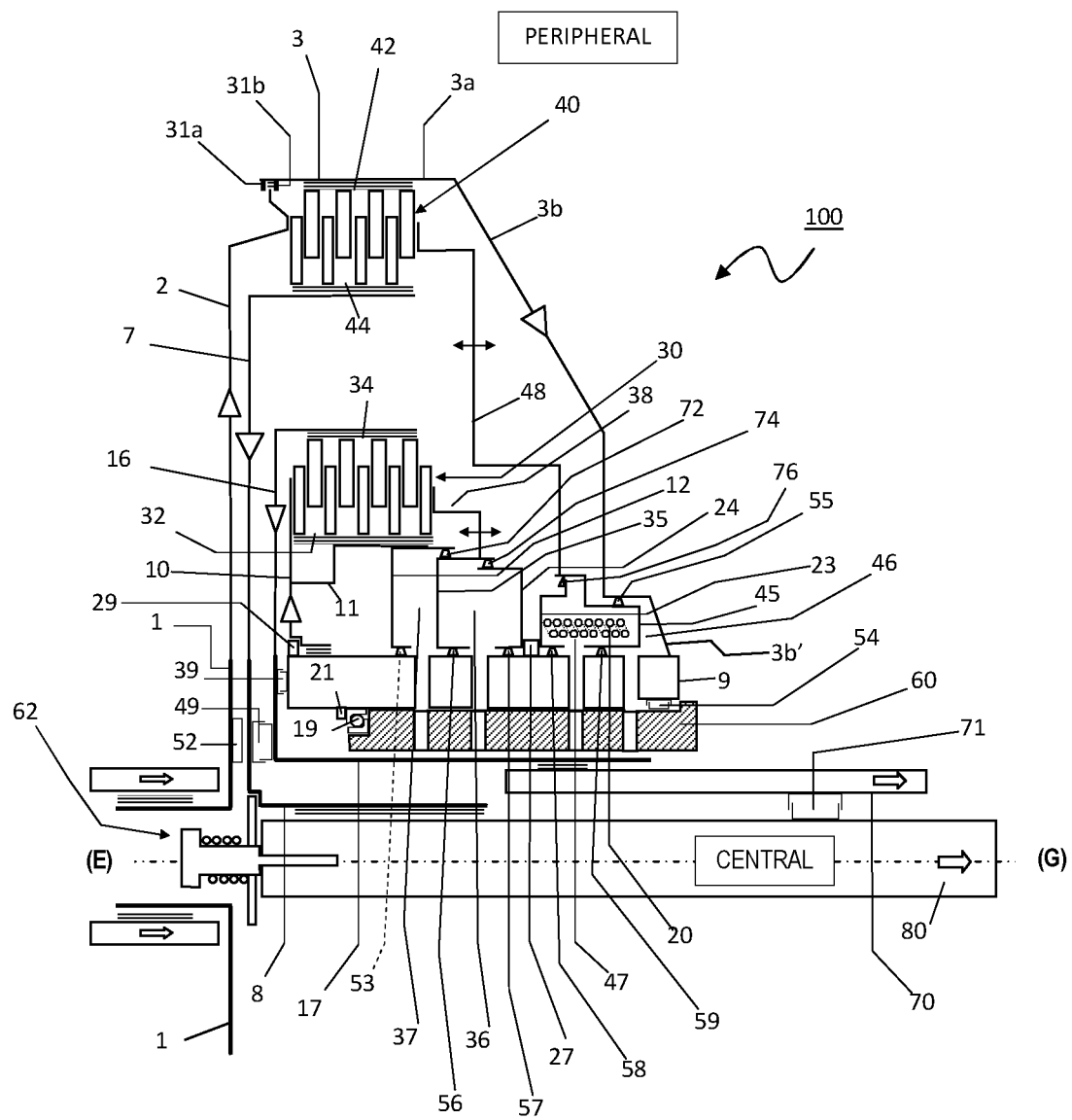
Figure 2A:
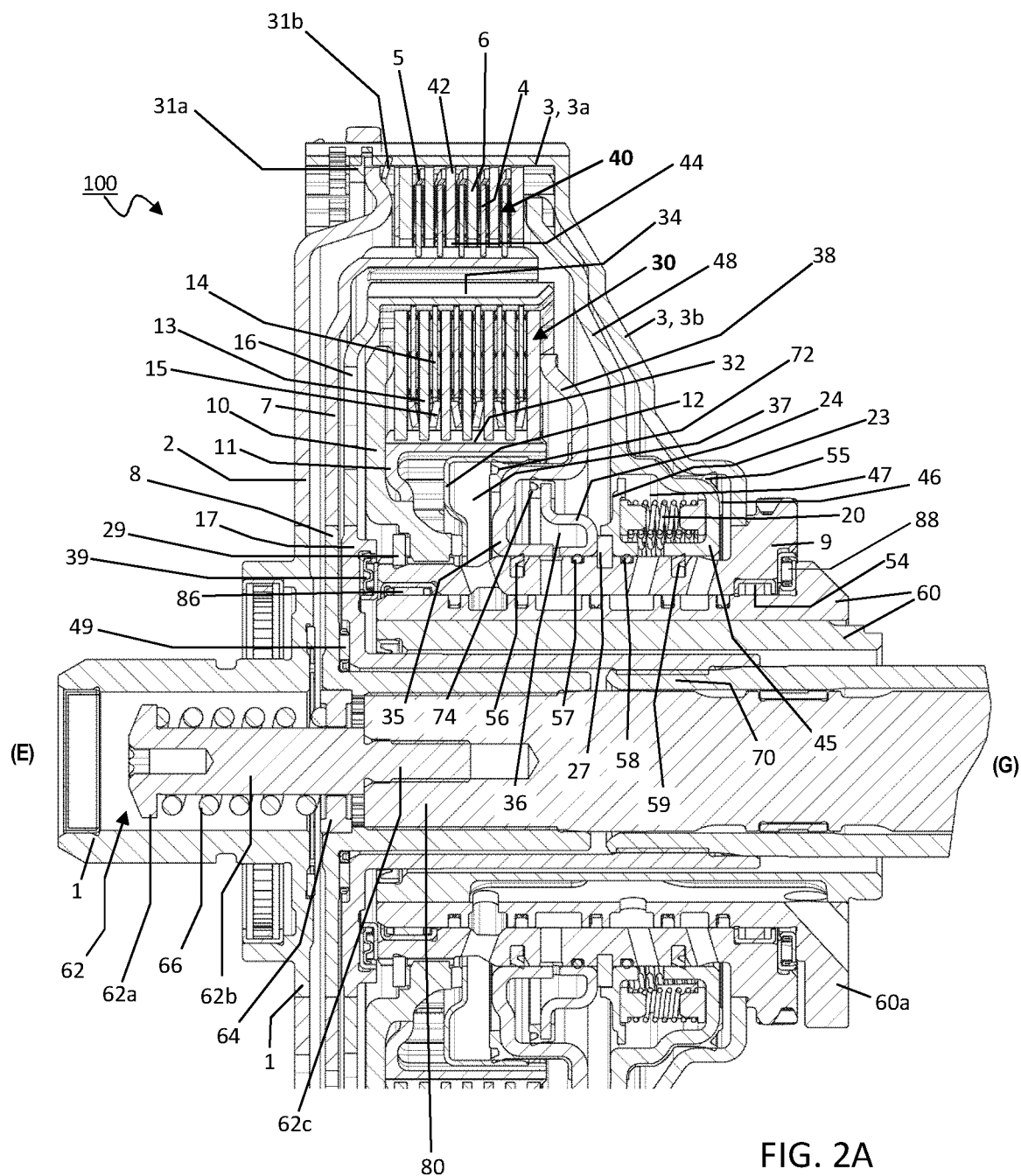
Figure 2B:
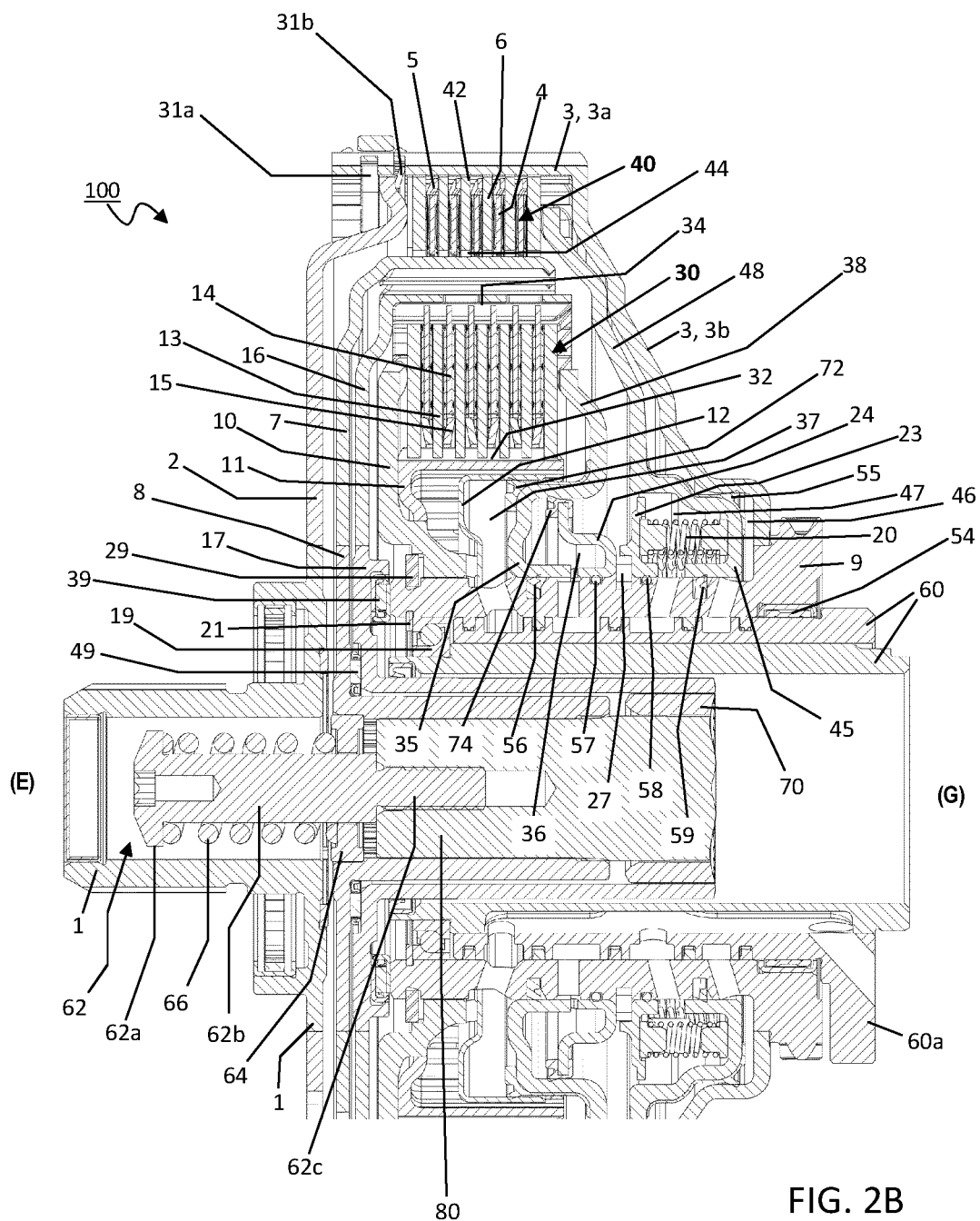

Before the present system and method of the invention are described, it is to be understood that this invention is not limited to particular systems and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +1-0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any $\geq 3$, $\geq 4$, $\geq 5$, $\geq 6$, $\geq 7$ or etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

A peripheral orientation is in a direction away from the central axis of the clutch unit. A central axis is co-axial with a central axis of the clutch unit outer output hub (17) and clutch unit inner output hub (8). An engine side (E) is closer to the connecting engine/flywheel. A gearbox side (G) is closer to the connecting gearbox. Axially fixed refers to parts where relative sliding in an axial direction is prevented (e.g. by a stop member or snap ring, weld). Rotationally fixed refers to parts where rotation is prevented (e.g. by a spline, weld).

Provided here in is a double clutch unit (100) for a transmission, having an engine side (E) and a gearbox (G) side. An exemplary double clutch pack is illustrated in FIGS. 1A, 1B and 2A, 2B. The double clutch unit (100) comprises an outer clutch pack (40) and an inner clutch pack (30) concentrically arranged, each having a clutch pack input (42, 32) and a clutch pack output (44, 34).

A hub as described herein comprises a hollow central cylindrical part disposed with an internal or external spline connector on an inside or outside surface respectively, and a flange part rotationally and axially attached and fixed to the hollow cylindrical part. The flange projects outwards from the hollow cylindrical part. Torque is transmitted via the hub to parts of the double clutch unit (100) that are concentrically arranged and radially distant. The flange is typically annular, attaching to an edge of the hollow cylindrical part. The flange may or may not be flat, it may be a continuous or discontinuous circle. The flange may be plate like.

A drum as described herein comprises a hollow peripheral cylindrical part disposed with an internal or external spline connector on an inside or outside surface of the cylindrical part respectively, and a side face rotationally and axially attached and fixed to the hollow cylindrical part (e.g. by weld or bolt). The hollow cylindrical part is disposed on a periphery of the drum. The side face projects inwards from the peripheral cylindrical part towards a central axis of rotation of the drum. Torque is transmitted via the drum to parts of the double clutch unit (100) that are concentrically arranged and radially distant. The side face is typically circular, attaching at its outer circumference to an edge of the peripheral cylindrical part. The side face may or may not be flat, it may be a continuous or discontinuous circle.

The double clutch unit (100) further comprises a clutch unit input hub (1) having a hollow central cylindrical part disposed with an external spline connector for attachment to a power input shaft and a flange part rotationally fixed and attached to the cylindrical part. The flange projects outwards from the hollow cylindrical part. The clutch unit input hub (1) is rotationally fixed to the outer clutch pack input (42) and the inner clutch pack input side (32). The flange part of the clutch unit input hub (1) may be attached to a drive plate (2) (e.g. by welding), which is rotationally fixed to outer clutch pack input side (42) and the inner clutch pack input side (32).

The double clutch unit (100) further comprises a clutch unit inner output hub (8) having a hollow central cylindrical part disposed with an internal spline connector for attachment to an inner power output shaft (80), and a flange part attached in fixed rotational relation to the outer clutch pack output side (44). The flange projects outwards from the hollow cylindrical part. The clutch unit inner output hub (8) may be attached to the outer clutch pack output side (44) via an outer clutch output drum (7) and external spline connection as shown, for instance, in FIGS. 1A, 1B and 2A, 2B. The clutch unit inner output hub (8) and the outer clutch output drum (7) may be mutually attached by a welded connection.

The double clutch unit (100) further comprises a clutch unit outer output hub (17) having a hollow central cylindrical part disposed with an internal spline connector for attachment to an outer power output shaft (70), and a flange part attached in fixed rotational relation to an inner clutch pack output side (34). The flange projects outwards from the hollow cylindrical part. The clutch unit outer output hub (17) may be attached to the inner clutch pack output side (34) via an inner clutch output drum (16) and an internal spline connection as shown, for instance, in FIGS. 1A, 1B and 2A, 2B. The clutch unit outer output hub (17) and inner clutch output drum (16) may be mutually attached by a welded connection.

The cylindrical parts of both clutch unit outer output hub (17) and clutch unit inner output hub (8) are concentrically arranged. Both clutch unit outer power output shaft (70) and clutch unit power output shaft (80) are concentrically arranged. Both outer clutch pack (40) and an inner clutch pack (30) are concentrically arranged.

By concentrically arranged it is meant that the parts are co-axial and at least partly overlap at an axial position. For instance, an outer part may surround circumferentially an inner part, and either an outer part covers at least partially, preferably entirely, an axial span of the inner part, or an inner part extends at least partially, preferably entirely, axially outwards from the outer part at one or both ends.

The double clutch unit (100) further comprises an oil distributor (9) disposed concentrically between the inner clutch pack (30) and the clutch unit outer output hub (17) and rotationally fixed to the inner clutch pack input side (32). The oil distributor (9) has hollow cylindrical form, and provided with a plurality of channels connecting an interior to an exterior surface. Oil from the oil distributor is used for lubrication and/or for operation of hydraulic components such as pistons.

The double clutch unit (100) further comprises a stator (60) disposed concentrically between the oil distributor (9) and a central axis of the double clutch unit (100). The oil distributor (9) is supported radially by the stator (60). The stator is a stationary part. The stator (60) comprises a hollow cylindrical part (60b) disposed a plurality of outer-surface annular channels for passage of oil to the oil distributor (e.g. FIG. 5). At the gearbox side (G) of the hollow cylindrical part (60b) is provided a stator flange (60a). The stator flange (60a) rotationally and axially fixed to the end of the hollow cylindrical part (60b) at the gearbox side (G).

Parts of the double clutch unit (100) from engine side (E) to gearbox (G) side are in order
flange part of the clutch unit input hub (1),
flange part of the clutch unit inner output hub (8),
flange part of the clutch unit outer output hub (17), and
oil distributor (9).

The flange part of the clutch unit outer output hub (17) is disposed axially between the flange part of the clutch unit inner output hub (8) and oil distributor (9). The flange part of the clutch unit inner output hub (8) is disposed axially between the flange part of the clutch unit input hub (1) and flange part of the clutch unit outer output hub (17).

Parts of the double clutch unit (100) from the central axis to radiating outwards peripherally are preferably in order:
clutch unit inner power output shaft (80),
cylindrical part of the clutch unit inner output hub (8),
clutch unit outer power output shaft (70),
cylindrical part of the clutch unit outer output hub (17),
stator (60),
oil distributor (9).

The clutch unit input hub (1), clutch unit inner output hub (8), the clutch unit outer output hub (17), the oil distributor (9) are normally axially slidable relative to the stator (60) in the absence of the constraining effect of the spring-loaded bolt (62) mentioned later below. The clutch unit input hub (1), clutch unit inner power output shaft (80), clutch unit inner output hub (8), clutch unit outer power output shaft (70), the clutch unit outer output hub (17), the oil distributor (9) are axially rotatable relative to the stator (80).

The clutch unit inner power output shaft (80), outer power output shaft (70) and stator (60) are maintained in axially fixed (non-slidable) relation. In other words, the clutch unit inner power output shaft (80) and the clutch unit outer power output shaft (70) are maintained in axially fixed (non-slidable) relation to the stator (60). The clutch unit inner power output shaft (80) is maintained in axially fixed (non-slidable) relation to the stator (60). For the inner power output shaft (80) and/or outer power output shaft (70) the axial fixation relative to the stator (60) may be achieved in the gearbox into which the clutch unit inner power output shaft (80) and the outer power output shaft (70) advance. A gearbox housing and a clutch housing are disposed in fixed (positional and orientational) relation, and the stator (60) is axially fixed to the clutch housing which makes it also axially fixed to the shafts (70) and (80).

The double clutch unit (100) further comprises a spring-loaded bolt (62) attached to the clutch unit inner power output shaft (80). The spring-loaded bolt (62) is attached to the engine side of the clutch unit inner power output shaft (80). It may be disposed in a threaded bore co-axial with the axis of rotation of the clutch unit inner power output shaft (80).

The spring-loaded bolt (62) applies an axial force in the gearbox (G) direction to the clutch unit inner output hub (8). Because the clutch unit inner output hub (8), the clutch unit outer output hub (17) and oil distributor (9) are tandemly arranged and axially slidable, forces applied to the clutch unit inner output hub (8) are transmitted to the clutch unit outer output hub (17) and oil distributor (9) and ultimately to the stator (60), maintaining these parts in axial alignment with respect to the stator (60) using only a single bolt. Hence, assembly and disassembly of the double clutch unit (100) is simplified.

Axial force generated by the spring-loaded bolt (62) may be transmitted in a direction from the engine (E) to gearbox (G):

from spring-loaded bolt (62) to clutch unit inner output hub (8),
from the flange part of clutch unit inner output hub (8) to the flange part of the clutch unit outer output hub (17) via a $1^{st}$ (thrust) bearing (49),
from the flange part of the clutch unit outer output hub (17) to the oil distributor (9) via a $2^{nd}$ (thrust) bearing (39), and
from the oil distributor (9) to the stator (60) via an oil distributor-stator bearing assembly (86, 88; 54, 86, 88; 19; 19, 54) comprising a thrust bearing (88) or angular contact bearing (19).

Axial sliding of the oil distributor (9) is limited in the gearbox direction by the thrust bearing (88) bearing (19) attached to the stator flange (60a) or angular contact bearing (19). attached to the stator cylindrical part (60b). Thus, the axial force applied by the spring-loaded bolt (62) determines a pre-loading of the oil distributor-stator bearing assembly (86, 88; 54, 86, 88; 19; 19, 54) comprising the thrust bearing (88) or angular contact bearing (19).

Axial force is transmitted in a direction from the engine (E) to gearbox (G):

from spring-loaded bolt (62) to clutch unit inner output hub (8),
from the flange part of clutch unit inner output hub (8) to the flange part of the clutch unit outer output hub (17) via a $1^{st}$ (thrust) bearing (49),
from the flange part of the clutch unit outer output hub (17) to the oil distributor (9) via a $2^{nd}$ (thrust) bearing (39), and
from the oil distributor (9) to the stator (60) via a 3rd (angular contact) bearing (19). Axial sliding of the oil distributor (9) is limited in the gearbox direction by the $3^{rd}$ (angular contact) bearing (19) attached to the stator (60). Thus, the axial force applied by the spring-loaded bolt (62) determines a pre-loading of the $1^{st}$, $2^{nd}$ and $3^{rd}$ bearings.

Figure 3A:
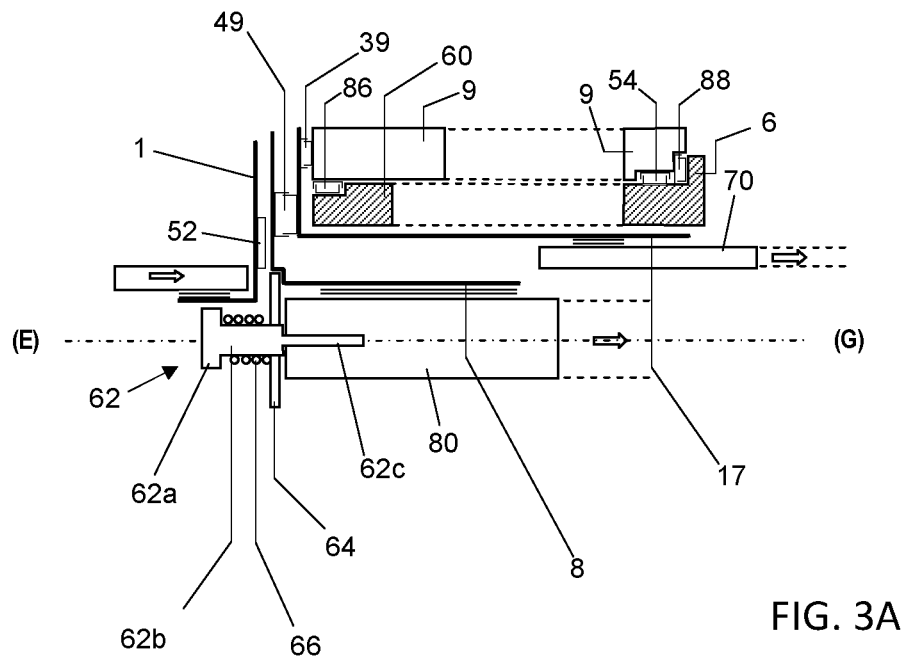
FIG. 3B is similar to FIG. 3A except the oil distributor-stator bearing assembly comprises an angular contact bearing (19).
Figure 3B:
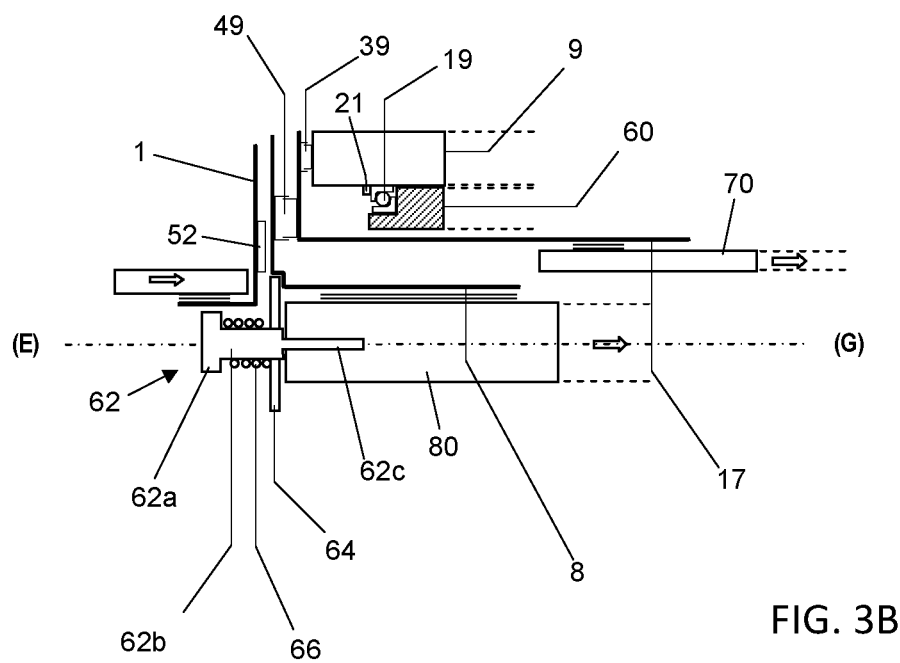
Figure 4A:
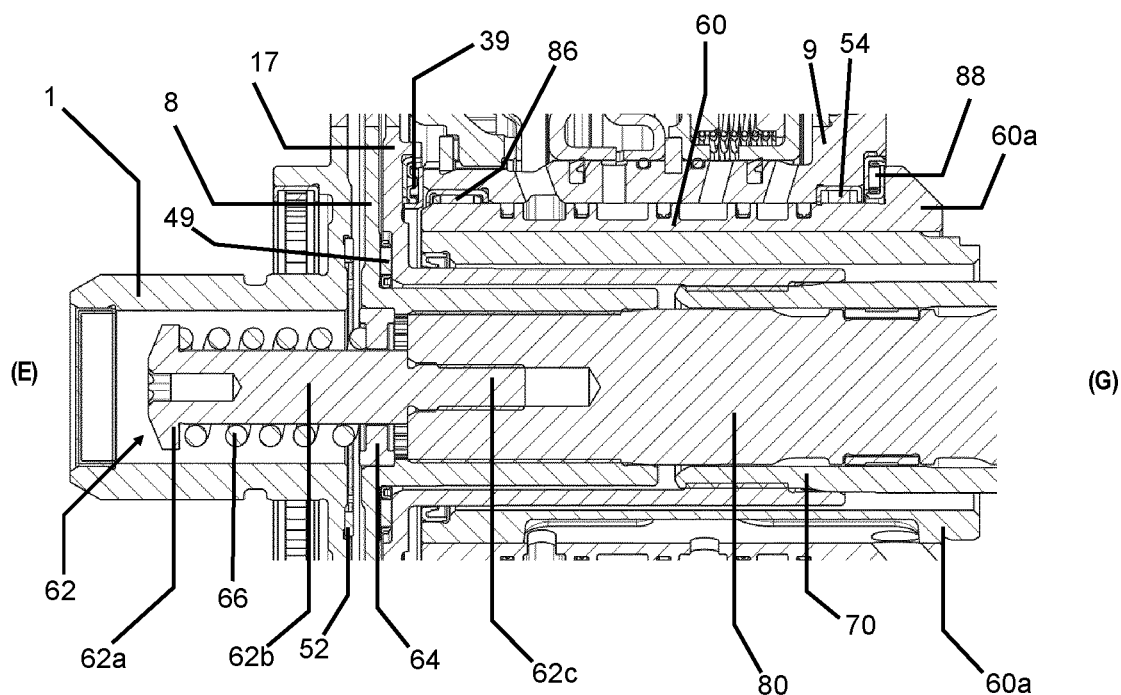
FIG. 4A is an axial cross-sectional view of a double clutch unit as described herein, in particular a detail of the spring load bolt. The oil distributor-stator bearing assembly comprises a thrust bearing (88) and two radial bearings (54, 86).
Figure 4B:
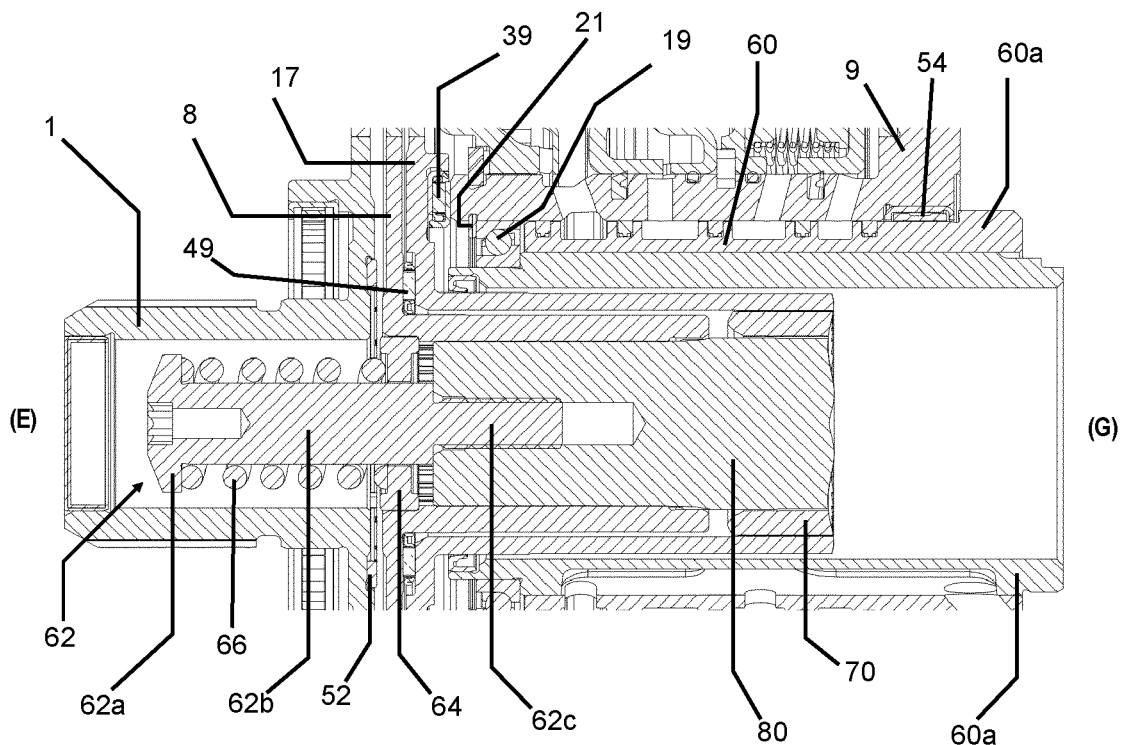
FIG. 4B is similar to FIG. 4A except the oil distributor-stator bearing assembly comprises an angular contact bearing (19) and radial bearing (54).

The spring-loaded bolt (62) comprises a bolt head (62a), a shank (62b) and a threaded section (62c), wherein said shank (62b) is positioned in between the bolt head (62a) and the threaded section (62c). A spring loaded bolt (62) is exemplarily illustrated in FIGS. 3A, 3B and 4A, 4B. A spring (66) (e.g. helical compression spring) is disposed on the shank. The bolt head (62a) has a larger profile than that of the spring (66), and contacts one end of the spring (66). Adjacent to and at the other end of the spring (66) may be an adapter (64). The adapter (64) is an annular ring (e.g. a washer). The adapter (64) has a larger diameter than the spring, and compression forces generated by the spring are applied to the adapter (64). The adapter (64) may in turn transmit compression forces to the clutch unit inner output hub (8), in particular to the flange part of the clutch unit inner output hub (8), more in particular to a corner between the cylindrical part and the flange (e.g. FIGS. 3A, 3B).

The threaded section (62c) of the bolt may have a smaller diameter than that of the shank (62b). When the bolt is tightened, the inner power output shaft (80) locks against the shank (62b), thereby fixing the compressed height of the spring (66).

The hollow cylindrical part of the clutch unit input hub (1) may be dimensioned for accommodating the bolt head (62a) and/or bolt shank. Thus, the bolt can be tightened and/or loosened via access from the engine side of the clutch unit input hub (1).

As mentioned elsewhere herein, a $1^{st}$ bearing (49) (also known as an inner output hub-outer output hub bearing (49)) may be disposed between the flange part of clutch unit inner output hub (8) and the flange part of the clutch unit outer output hub (17). The $1^{st}$ bearing (49) may be a thrust bearing.

As mentioned elsewhere herein, a $2^{nd}$ bearing (39) (also known as an outer output hub-oil distributor bearing (39)) may be disposed between a flange part of the clutch unit outer output hub (17) and an end of oil distributor (9). The $2^{nd}$ bearing (39) may be a thrust bearing.

As mentioned elsewhere herein, an oil distributor-stator bearing assembly (86, 88; 54, 86, 88; 19, 54) comprising one or more bearings acting separately or in combination in a radial and axial direction may be disposed between the oil distributor (9) and the stator (60). The oil distributor-stator bearing assembly (86, 88; 54, 86, 88; 19; 19, 54) supports axial rotation of the oil distributor (9) on the stator (60) and limits axial movement of the oil distributor (9) relative to the stator (60) in the direction of the gearbox (G).

The oil distributor-stator bearing assembly (86, 88; 54, 86, 88; 19, 54) may comprise one or more thrust bearings (88) that axially support rotation and limit movement of the oil distributor (9) relative to the stator (60) in the direction of the gearbox (G), and one or more radial bearings (86, 54) that radially supports rotation of the oil distributor (60) relative to the stator (60). An exemplary configuration is shown in FIGS. 1A, 2A, 3A, 4A.

The oil distributor-stator bearing assembly (86, 88; 54, 86, 88; 19, 54) may comprise one or more angular bearings (19) (also known a $3^{rd}$ bearing (19)) that axially support rotation and limit movement of the oil distributor (9) relative to the stator (60) in the direction of the gearbox (G) and also radially supports rotation of the oil distributor (60) relative to the stator (60), and one or more radial bearings (86, 54) that radially supports rotation of the oil distributor (60) relative to the stator (60). An exemplary configuration is shown in FIGS. 1B, 2B, 3B, 4B.

The radial bearing (86, 54) bearing may be disposed such that it acts concentrically between the oil distributor (9) and the stator (60), in particular between the oil distributor (9) and the hollow cylindrical part (60b) of the stator (60). The radial bearing (86, 54) also bears radial forces when the oil distributor (9) rotates relative to the stator (60). The radial bearing may be a needle bearing. The radial bearing (86, 54) may be disposed at the engine side (E) and/or at the gearbox side (G) of the oil distributor (9). The radial bearing (86, 54) may be disposed on the hollow cylindrical part (60b) of the stator (60).

The thrust bearing (88) bearing may be disposed such that it acts axially between the oil distributor (9) and the stator flange (60b). The thrust bearing (88) bearing limits axial movement of the oil distributor (9) relative to the stator (60) in the direction of the gearbox; it also bears axial forces when the oil distributor (9) rotates relative to the stator (60). Hence, axial forces applied by the clutch unit outer output hub (17) to the oil distributor (9) advance the oil distributor (9) in the direction of the gearbox, and movement of the oil distributor (9) is stopped by the stator flange (60*b*) via the intervening thrust bearing (88). The stator flange (60*b*) acts as stop member to prevent axial movement of the oil distributor (9) towards the gearbox (G). Forces from the spring-bolt (62) may be applied to stator flange (60*b*) via the thrust bearing (88).

The angular contact bearing (also known herein as the 3$^{rd}$ bearing (19)) may be disposed between the oil distributor (9) and the stator (60), in particular between the oil distributor (9) and the hollow cylindrical part (60*b*) of the stator (60). The angular contact bearing may be disposed such that it acts concentrically between the oil distributor (9) and the stator (60), in particular between the oil distributor (9) and the hollow cylindrical part (60*b*) of the stator (60). The angular contact bearing acts in both axial and radial directions. The angular contact bearing may be disposed at the engine side (E) of the oil distributor (9). The angular contact bearing may be disposed at the engine side (E) of the stator (60), in particular of the hollow cylindrical part (60*b*) of the stator (60).

Preferably, the oil distributor-stator bearing assembly comprises one or more thrust bearings (88), and one or more, preferably two radial bearings (86, 54). One thrust bearing (88) may be disposed at the gear box (G) side, one radial bearing (54) may be disposed at the gear box (G) side, one radial bearing (86) may be disposed at the engine (E) side of the stator (60) or oil distributor (9). An exemplary configuration is shown in FIGS. 1A, 2A, 3A, 4A.

As mentioned elsewhere, the angular contact (19) bearing limits axial movement of the oil distributor (9) relative to the stator (60) in the direction of the gearbox; it also bears axial forces when the oil distributor (9) rotates relative to the stator (60). The angular contact bearing also bears radial forces when the oil distributor (9) rotates relative to the stator (60). Hence, axial forces applied by the clutch unit outer output hub (17) to the oil distributor (9) advance the oil distributor (9) in the direction of the gearbox, and movement of the oil distributor (9) is stopped by the stator (60) via the intervening angular contact bearing (19). A stop member (21) (e.g. a snap ring) may be disposed axially fixed to the oil distributor (9) to the engine side (E) of the 3$^{rd}$ bearing (19) to prevent axial movement of the 3$^{rd}$ bearing (19) towards the engine. Forces from the spring-bolt (62) may be applied to the 3$^{rd}$ bearing (19) via the stop member (21).

The stator flange (60*a*) does not need to receive axial forces from the spring loaded bolt (62), as they are taken up by the 3$^{rd}$ (angular contact) bearing (19) at the engine side (E) of the oil distributor (9) and the hollow cylindrical part (60*b*) of the stator (60). In particular these axial forces are taken up directly by the hollow cylindrical part (60*b*) of the stator (60). Accordingly, stator flange (60*a*) may not contact the gearbox side (G) end of the oil distributor (9). There is no requirement for a thrust bearing between the stator flange (60*a*) the gearbox side (G) end of the oil distributor (9) when there is a 3$^{rd}$ (angular contact) bearing (19).

Figure 5:
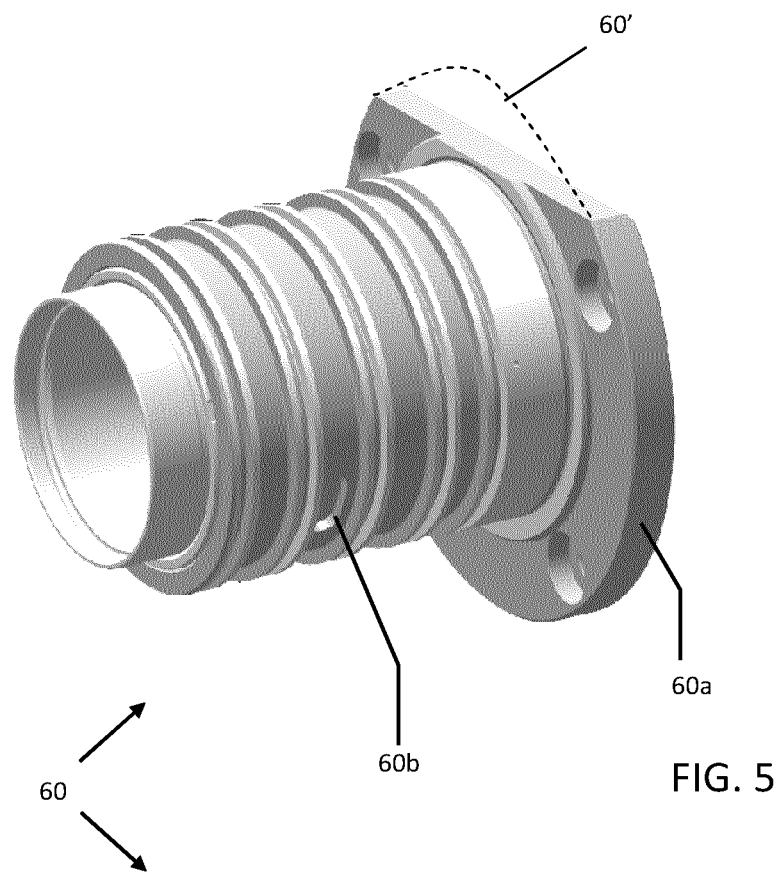
FIG. 5 is an isometric view of a stator as described herein.
Figure 6:
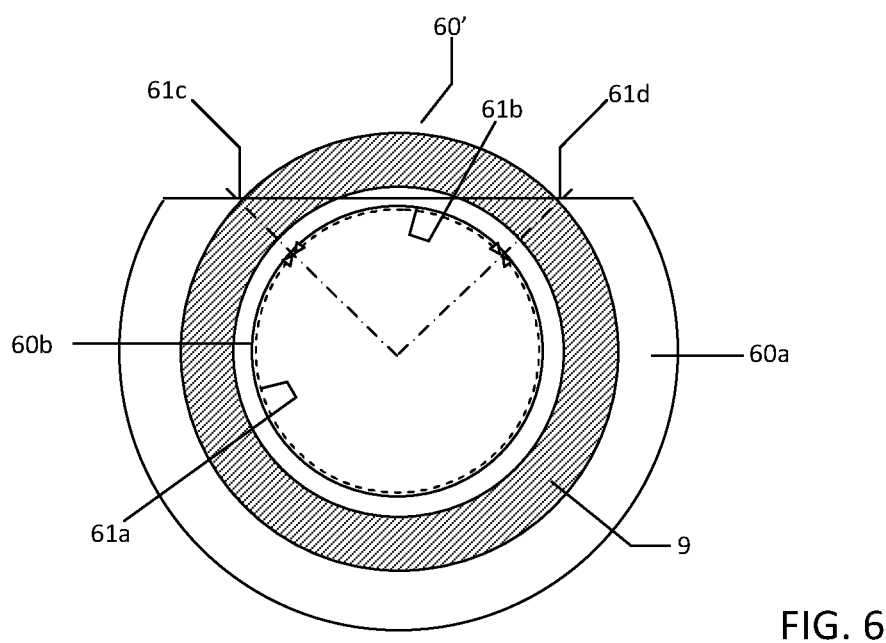
FIG. 6 is an end view of a stator as described herein together with an oil distributor.

The gearbox side stator flange (60*a*) may have a profile of a circle with a section (60') left out, as shown, for instance, in FIGS. 5 and 6. The gearbox side stator flange (60*a*) may have a profile of a truncated circle. Because the space-saving arises at an axial end of the dual clutch unit, rather than within a peripheral space inside the clutch unit, the space (60') has an impact on the overall packaging size. The space (60') otherwise taken up by the flange (60*a*) may be used for other purposes, such as an oil pump or side shafts of a differential and wheels. This arrangement also avoids the need for an axial thrust bearing between the oil distributor and stator flange; thereby the axial length of the clutch is reduced.

One or more further bearings (54) may be disposed between the oil distributor (9) and the stator (60), in particular the cylindrical part (60*a*) thereof, e.g. one or more needle bearings. One or more further bearings (71) may be disposed between the outer power output shaft (70) and inner power output shaft (80).

One or more seal may disposed between parts in order to retain or route a flow of lubricating/hydraulic oil.

An annular seal (53) may optionally be disposed between the axially stationary part (12) of the inner clutch pack piston hydraulic balancing chamber (37) and the oil distributor (9). It may be attached to the oil distributor (9). It may be any type of annular seal, including but not limited to an O-ring, vulcanised or lip seal. It may be disposed in a groove.

A seal (56) may be provided between the axially sliding part (35) of the inner clutch pack piston pressure chamber (36) and the oil distributor (9) (e.g. lip-seal (56) attached to the oil distributor (9)). It may be disposed in a groove. It may be attached to the oil distributor (9).

A seal (59) may be provided between axially sliding part (45) of the outer clutch pack piston hydraulic balancing chamber (47) and the oil distributor (9) (e.g. lip-seal (59) attached to the oil distributor (9)). It may be disposed in a groove. It may be attached to the oil distributor (9).

A seal (57) may be provided between the axially stationary part (24) of the inner clutch pack piston pressure chamber and the oil distributor (9) (e.g. O-ring (57) attached to the oil distributor (9)). It may be disposed in a groove. It may be attached to the oil distributor (9).

A seal (58) may be provided between the axially stationary part (23) of the outer clutch pack piston hydraulic balancing chamber (47) and the oil distributor (9) (e.g. O-ring (58) attached to the oil distributor (9)). It may be disposed in a groove. It may be attached to the oil distributor (9).

A seal (72) may be provided between the axially stationary part (12) of the inner clutch pack piston hydraulic balancing chamber (37) and the axially sliding part (35) of the inner clutch pack piston pressure chamber (36) (e.g. vulcanized seal attached to the axially sliding part (35)). It may be disposed in a groove. It may be attached to the axially sliding part (35).

A seal (74) may be provided between the axially sliding part (35) of the inner clutch pack piston pressure chamber (36), and the axially stationary part (24) of the inner clutch pack piston pressure chamber (e.g. vulcanized seal attached to the axially stationary part (24)). It may be disposed in a groove. It may be attached to the axially stationary part (24)).

A seal (76) may be provided between the axially stationary part (23) of the outer clutch pack piston hydraulic balancing chamber (47) and the axially sliding part (45) of the outer clutch pack piston hydraulic balancing chamber (47) (e.g. a vulcanized seal attached to the axially stationary part (23)). It may be disposed in a groove. It may be attached to the axially stationary part (23)).

A seal (55) may be provided between the axially sliding part (45) of the outer clutch pack piston hydraulic balancing chamber (47) and the axially stationary part (3*b'*) formed in the side face (3*b*) of the drive drum (3) (e.g. a vulcanized seal attached to the axially sliding part (45)). It may be disposed in a groove. It may be attached to the axially stationary part (45)).

A thrust washer (52) may be attached to the gear box side of the flange part of the clutch unit input hub (1). The thrust washer (52) may be made from a hard-wearing polymeric material such as Victrex™ WG101, or PEEK. While there is gap between the flange part of the clutch unit input hub (1) and the flange part of the clutch unit inner output hub (8), the parts may momentarily touch typically after assembly or during transport; the buffering washer, being made from a polymeric material, allows the parts to touch without metal-on-metal contact. The thrust washer (52) may be dismountably attached to the gear box side of the flange part of the clutch unit input hub (1). A dismountable attachment allows the thrust washer (52) to be replaced, for instance, in the event of wear.

The double clutch unit (100) may further comprises a drive plate (2) disposed on the engine side of both clutch packs (30, 40) rotationally fixed to the clutch unit input hub (1). The drive plate (2) is disposed at the engine (E) side of the flange part of the clutch unit inner output hub. The drive plate (2) may be rotationally fixed to the clutch unit input hub (1) by a welded attachment. The drive plate may comprise a circular plate.

The double clutch unit (100) may further comprise a drive drum (3), having:
  a hollow peripheral cylindrical part (3a) extending axially over the outer clutch pack (40), and
  a side face (3b) extending over the gearbox side of both clutch packs (30, 40) to the oil distributor (9). The hollow peripheral cylindrical part (3a) extends axially over the outside of the outer clutch pack (40). The side face (3b) is rotationally (and axially) fixed the hollow peripheral cylindrical part (3a).

The drive drum (3) at the gearbox side (G) may be attached to the oil distributor (9) by a welded connection The drive plate (2) may be connected to the drive drum (3) via one or more (e.g. two) retaining (snap) rings for axial fixation and via a spline connection for transferring torque. The drive drum (3) may be rotationally fixed to the outer clutch pack input side (42) via a spline connection. The spline connection is preferably by way of an internal spline connector on the inner surface of the hollow peripheral cylindrical part of the drum. The weld connection is between the oil distributor (9) and the side face of the drum (3b).

The double clutch unit (100) further may comprises an inner clutch end (input) plate (10) that is rotationally fixed (at the engine side) to the oil distributor (9) and to the inner clutch input side (32). An inner clutch end plate (10) may be rotationally fixed to the oil distributor (9) at an axial position that is at the engine side (E) of the oil distributor (9). An inner clutch drum (11) extending in an axial direction towards the gearbox side (G) may be rotationally fixed (e.g. by welding) to the inner clutch end (input) plate (10). An external spline may be disposed on the inner clutch drum (11), for connection to the inner clutch input side (32).

The drive plate (2), drive drum (3), oil distributor (9), and inner clutch end plate (10) may be mutually rotationally fixed.

Torque may be transferred from the clutch unit input hub (1) to the outer clutch pack input side (42) via a power flow path from the input hub (1), to drive plate (2), to drive drum (3) to outer clutch pack input side (42).

Torque is transferred from the clutch unit input hub (1) to the inner clutch pack input side (32) via a power flow path the input hub (1), to drive plate (2), to drive drum (3), to oil distributor, to inner clutch end plate (10), to inner clutch pack input side (32).

The outer clutch pack (40) contains a plurality of friction plates (4) intercalated between a plurality of steel separator plates (6). In one configuration, the separator plates (6) are connected to the outer clutch pack input side (42) and the friction plates (4) are connected to the outer clutch pack output side (44). When the outer clutch pack (40) is disengaged, no torque nor speed is transferred from the outer clutch pack input side (42) to the outer clutch pack output side (44). When the outer clutch pack (40) is engaged or slipping torque and speed are transferred from the outer clutch pack input side (42) to the outer clutch pack output side (44) depending on the degree of slipping. One or more springs (5) (e.g. wave springs) may be provided between the separator plates (6) biased to maintain the respective plates open to reduce drag torque. The one or more springs (5) bias the outer clutch pack in a disengaged state.

The drive plate (2) may be configured as an engine side end stop for the outer clutch pack (40). The end stop receives axial forces applied by an outer clutch pack piston actuating plate (48) to compress the outer clutch pack (40) to engage or slip the clutch.

The inner clutch pack (30) contains a plurality of friction plates (14) intercalated between a plurality of (steel) separator plates (13). In one configuration, the separator plates (13) are connected to the inner clutch pack input side (32) and the friction plates (14) are connected to the inner clutch pack output side (34). When the inner clutch pack (30) is disengaged, no torque nor speed is transferred from the inner clutch pack input side (32) to the inner clutch pack output side (34). When the inner clutch pack (30) is engaged or slipping torque and speed are transferred from the inner clutch pack input side (32) to the inner clutch pack output side (34) depending on the degree of slipping. One or more springs (15) (e.g. return springs) may be provided between the separator plates (6) biased to maintain the respective plates open. The one or more springs (5) bias the inner clutch pack in a disengaged state.

The inner clutch end plate (10) may be configured as an engine side end stop for the inner clutch pack (40). The inner clutch end plate (10) may be further axially fixed in connection to the oil distributor (9). Axial sliding may be limited by a snap ring (29) disposed at the engine side (E) of the inner clutch end plate (10) axially fixed to the oil distributor. The end stop receives axial forces applied by an inner clutch pack piston (38) (see later below) to compress the inner clutch pack (30) to engage or slip the clutch.

The layout of the piston return springs (central and/or in between the plates) allows for accurate opening and closing, as well as reduce drag torque.

The double clutch unit (100) may further comprise an inner clutch pack piston (38) for controllable actuation (engaged, slipping, disengaged) of the inner clutch pack (30). The inner clutch pack piston (38) is axially slidable responsive to expansion or contraction of an inner clutch pack pressure chamber (36). The inner clutch pack pressure chamber (36) is defined by a sliding chamber part (35) of the inner clutch pack piston (38) and an axially stationary part (24). The inner clutch pack pressure chamber (36) contains pressurised hydraulic fluid supplied via the oil-distributor (9). The sliding chamber part (35) and/or axially stationary part (24) may contain a holding space for the pressurised hydraulic fluid. The inner clutch pack piston (38) including the sliding chamber part (35) may be formed from one piece or one or more pieces connected by one or more permanent joints (e.g. welding, bolts). Axial sliding of the axially stationary part (35) relative to the oil-distributor (9) may be limited or prevented by a split ring (27) described later below. The inner clutch pack piston (38) compresses the inner clutch pack (30) thereby controlling clutch engagement, slipping, and disengagement. The inner clutch pack pressure chamber (36), stationary part (24) and sliding chamber part (35) of the inner clutch pack pressure chamber (36) are annular structures disposed around the oil distributor (9). They are provided in axial direction from engine side (E) to gearbox side (G): sliding chamber part (35), inner clutch pack pressure chamber (36), stationary part (24).

The double clutch unit (100) may further comprise an inner clutch pack piston hydraulic balancing chamber (37). The inner clutch pack piston hydraulic balancing chamber (37) may be defined by the sliding chamber part (35) of the inner clutch pack piston (38) and an axially stationary part (12). The sliding chamber part (35) and/or axially stationary part (12) may contain a holding space for hydraulic fluid. The axially stationary part (12) may be welded to the inner clutch end plate (10) and/or inner clutch drum (11). Axial sliding of the axially stationary part (12) relative to the oil-distributor (9) may be limited or prevented by a snap ring (29) disposed at the engine side (E) of the inner clutch end plate (10) axially fixed to the oil distributor as described elsewhere herein. Hydraulic fluid is provided to the inner clutch pack piston hydraulic balancing chamber (37) to counter a build-up hydraulic pressure caused by centrifugal forces acting in the inner clutch pack piston pressure chamber (36) that close the inner clutch pack. The hydraulic fluid may be provided under passive pressure to the inner clutch pack piston hydraulic balancing chamber (37).

The inner clutch pack piston hydraulic balancing chamber (37), stationary part (12) and sliding chamber part (35) are annular structures disposed around the oil distributor (9). They are provided in axial direction from engine side (E) to gearbox side (G): axially stationary part (12) of the piston hydraulic balancing chamber (37), piston hydraulic balancing chamber (37), and sliding chamber part (35) of the inner clutch pack piston (38).

The stationary part (24) and sliding chamber part (35) of inner clutch pack pressure chamber (36) may be connected to the oil distributor (9) via one or more annular seals (56, 57). For instance, the sliding chamber part (35) may be positioned on lip seal (56), and the axially stationary part (24) positioned on O-ring (57). One or more seals (74) (e.g. vulcanized seal) may be disposed between the axially stationary part (24) and sliding chamber part (35) of inner clutch pack pressure chamber (36). One or more seals (72) (e.g. vulcanized seal) may be disposed between the axially stationary part (12) and sliding chamber part (35) of inner clutch pack piston hydraulic balancing chamber (37). Rotation of the inner clutch pack piston (38), sliding chamber part (35) and axially stationary part (24) is essentially synchronised with rotation of the oil distributor (9). Friction between the oil distributor and seals, and between pistons and seals is sufficient that rotation is essentially synchronised.

The double clutch unit (100) may further comprise an outer clutch pack piston (48) for controllable actuation (engaged, slipping, disengaged) of the outer clutch pack (40). The outer clutch pack piston (48) is axially slidable responsive to expansion or contraction of an outer clutch pack pressure chamber (46). The outer clutch pack pressure chamber (46) is defined by a sliding chamber part (45) of the outer clutch pack piston (48) and an axially stationary part (3b') formed in the side face (3b) of the drive drum (3). The outer clutch pack pressure chamber (46) contains pressurised hydraulic fluid supplied via the oil-distributor (9). The sliding chamber part (45) and/or axially stationary part (3b') may contain a holding space for the pressurised hydraulic fluid. The outer clutch pack piston (48) including the sliding chamber part (45) may be formed from one piece or one or more pieces connected by one or more permanent joints (e.g. welding, bolts). Axial sliding of the axially stationary part (3b') relative to the oil-distributor (9) is prevented by the welded connection of the drive drum (3) to the oil-distributor (9).

The outer clutch pack pressure chamber (46) and sliding chamber part (45) of the outer clutch pack pressure chamber (36) are annular structures disposed around the oil distributor (9). They are provided in axial direction from engine side (E) to gearbox side (G): sliding chamber part (45), outer clutch pack pressure chamber (36) and axially stationary part (3b') formed in the side face (3b) of the drive drum (3). The outer clutch pack piston (48) compresses the outer clutch pack (40) thereby controlling clutch engagement, slipping, and disengagement.

The double clutch unit (100) may further comprise an outer clutch pack piston hydraulic balancing chamber (47). The outer clutch pack piston hydraulic balancing chamber (47) may be defined by the sliding chamber part (45) of the outer clutch pack piston (48) and an axially stationary part (23). The axially stationary part (23) may be disposed to the engine side of the sliding chamber part (45). The sliding chamber part (45) and/or axially stationary part (23) may contain a holding space for the hydraulic fluid. Axial sliding of the axially stationary part (23) relative to the oil-distributor (9) is limited or prevented by a split ring (27) described later below. The outer clutch pack piston hydraulic balancing chamber (47) may comprise a spring pack (20) to bias the outer clutch pack piston hydraulic balancing chamber (47) in an open position. Hydraulic fluid is provided to the outer clutch pack piston hydraulic balancing chamber (47) to counter a build-up hydraulic pressure caused by centrifugal forces acting in the outer clutch pack piston pressure chamber (46) that close the outer clutch pack. The hydraulic fluid may be provided under passive pressure to the outer clutch pack piston hydraulic balancing chamber (47).

The outer clutch pack piston hydraulic balancing chamber (47), sliding chamber part (45) and axially stationary part (23) are annular structures disposed around the oil distributor (9). They are provided in axial direction from engine side (E) to gearbox side (G): axially stationary part (23), piston hydraulic balancing chamber (47), and sliding chamber part (45) of the outer clutch pack piston (48).

The axially stationary part (23) of the outer clutch pack piston hydraulic balancing chamber (47), and sliding chamber part (45) of outer clutch pack pressure chamber (36) may be connected to the oil distributor (9) via one or more annular seals (58, 59). For instance, the sliding chamber part (45) may be positioned on lip seal (59), and the axially stationary part (23) positioned on O-ring (58). One or more seals (76) (e.g. a vulcanized seal) may be disposed between the axially stationary part (23) and sliding chamber part (45) of outer clutch pack piston hydraulic balancing chamber (47). Rotation of the outer clutch pack piston (48), sliding chamber part (45) and axially stationary part (23) is essentially synchronised with rotation of the oil distributor (9). Friction between the oil distributor and seals, and between pistons and seals is sufficient that rotation is essentially synchronised.

The side face (3b) of the drive drum (3) may be disposed at gearbox side of both the inner clutch pack piston and outer clutch pack piston. The axially slidable inner clutch pack piston (38) may be disposed on the engine side of the axially slidable outer clutch pack piston (48).

The split ring (27) axially fixed around the oil distributor (9) to limit an axial sliding motion of the stationary part (24) of the inner clutch pack pressure chamber (36), and the split ring (27) to limit axial sliding motion of the stationary part (23) of the outer clutch pack piston hydraulic balancing chamber (47), may be one and the same. The split ring (27) may be disposed between the stationary part (24) of the inner clutch pack pressure chamber (36) and the axially stationary part (23) of the outer clutch pack piston hydraulic balancing chamber (47). The axially stationary parts (23) and (24) are not welded to the oil distributor (9) but are each mounted on an O-ring (57, 58) and separated by the split ring (27) that limits axial movement; this ensures an ease of assembly and disassembly. Axially fixing axially stationary parts (23) and (24) to reduce cross talk between the clutches. By positioning the pressure chamber of the inner clutch piston next to the outer clutch hydraulic balancing chamber, the design of the clutch is more compact axially. The split ring (27) may be disposed abutting a shoulder on the stationary part of the outer clutch hydraulic balancing chamber.

The double clutch (100) may further comprise a stator (60). The stator (60) is a non-moving part of the double clutch. The stator (60) remains static compared with other torque-transmitting parts of the clutch. The stator (60) may have a cylindrical part (60b) and an end flange part (60a) disposed at the gear box (G) side.

The stator (60), in particular of the cylindrical part (60b), radially supports the oil distributor (60) by one or more radial (e.g. needle) bearings (86, 54) and/or by one or more angular bearings (19). In FIGS. 1A, 2A, 3A, 4A the stator (60) radially supports the oil distributor (60) by one or more radial (e.g. needle) bearings (86, 54). In FIGS. 1B, 2B, 3B, 4B the stator (60) radially supports the oil distributor (60) by an angular bearing (19) and a radial (e.g. needle) bearing (54). The stator (60), in particular of the cylindrical part (60b), radially supports the other parts of the clutch including oil distributor (9), clutch packs (30, 40), plates (7, 10), inner clutch pack piston hydraulic balancing chamber (37), inner clutch pack pressure chamber (36), outer clutch pack piston hydraulic balancing chamber (47), and outer clutch pack pressure chamber (46).

The stator (60), axially supports the oil distributor (60) by one or more thrust bearings (88) and/or by one or more angular bearings (19). In FIGS. 1A, 2A, 3A, 4A the stator (60), in particular the flange part (60a), axially supports the oil distributor (60) by one or more thrust bearings (88). In FIGS. 1B, 2B, 3B, 4B the stator (60), in particular the cylindrical part (60b), radially supports the oil distributor (60) by an angular bearing (19). The oil distributor (9), clutch packs (30, 40), plates (7, 10), pistons rotate relative to the stator (60). The stator (60) comprises one or more channels for the passage of oil to the oil-distributor (9). The oil distributor (9) may be disposed concentrically around the outside of the stator (60), in particular of the cylindrical part (60b). The axial span of the oil distributor (9) and of the stator (60), in particular of the cylindrical part (60b) may overlap, or the axial span of one of the oil distributor (9) and of the stator (60), in particular of the cylindrical part (60b), may be subsumed by the axial span of the other. The clutch unit outer power output shaft (70) may be disposed concentrically within the stator (60), in particular of the cylindrical part (60b). The axial span of the outer power output shaft (70) and of the stator (60), in particular of the cylindrical part (60b), may overlap. The axial span of one of the oil distributor (9) and of the stator (60), in particular of the cylindrical part (60b), may be subsumed by axial span of the other.

The gearbox side (G) stator flange (60a) may extend outwards from the cylindrical part (60b) in a peripheral direction and is transverse to a central axis of the cylindrical part (60b). The stator flange (60a) may extend in a peripheral direction beyond a peripheral edge (61c, 61d) of the oil distributor (9) only in a portion (flange portion) (61a) of the circumference of the cylindrical part (60b), leaving a portion (non-flange portion) (61b) of the circumference of the cylindrical part (60b) that does not extend beyond a peripheral edge (61c, 61d) of the oil distributor (9). The flange portion (61a) may span across more than 30-95%, preferably 50-80% of the circumference of the cylindrical part (60b). The space (60') otherwise taken up by the stator flange (60a) may be used for other purposes. The gearbox side stator flange (60a) is shown, for instance, in FIGS. 5 and 6, with FIG. 6 showing the non-flange portion (61b) of the circumference of the cylindrical part (60b) and space (60').

The gearbox side stator flange (60a) may have a profile of a circle with a section (60') left out, as shown, for instance, in FIGS. 5 and 6. The gearbox side stator flange (60a) may have a profile of a truncated circle. Because the space-saving arises at an axial end of the dual clutch unit, rather than within a peripheral space inside the clutch unit, the space (60') has an impact on the overall packaging size. The space (60') otherwise taken up by the flange (60a) may be used for other purposes, such as an oil pump or side shafts of a differential and wheels. This arrangement also avoids the need for an axial thrust bearing between the oil distributor and stator flange; thereby the axial length of the clutch is reduced.

One or more further bearings (54) may be disposed between the oil distributor (9) and the stator (60), in particular the cylindrical part (60a) thereof, e.g. one or more needle bearings. One or more further bearings (71) may be disposed between the outer power output shaft (70) and inner power output shaft (80).

The oil distributor (9) contains a plurality of channels for the distribution of oil within the double clutch unit (100) for lubrication, cooling and hydraulic pressure. Channels in the oil distributor are in connection with the stator and oil is directed via the stator and oil distributor into the clutch unit for lubrication, and for operation of the hydraulic chambers. Sealing of the oil channels between the non-moving stator (60) and the rotating oil distributor (9) is ensured with one or more piston rings. The oil distributor comprises a cylindrical body containing the aforementioned plurality of channels.

The drive plate (2) may be dismountably attached to the drive drum (3), preferably by one or more retaining rings, preferably wherein two retaining rings flank the drive plate (2). The retaining rings dismountably attach to the drive drum (3). Preferably drive plate (2) may be dismountably attached to the drive drum (3) by an engine side (flat) retaining ring (31a) (e.g. flat ring) and by a gearbox side retaining ring (31b) (e.g. Belleville (conical spring)). The drive plate (2) may be axially slidably fixed by the flanking retaining rings. The drive plate (2) may be further dismountably attached to the drive drum (3) via a spline connection for transferring torque. The drive plate (2) may be provided with an external spline, the drive drum (3) hollow peripheral cylindrical part (3a) may be provided with a complementary internal spline.

The drive plate (2) may be configured as an (engine side) end stop for the outer clutch pack (40). The end stop receives axial forces applied by the outer clutch pack piston (48) to compress the outer clutch pack (40).

The engine side retaining ring (31a) and gearbox-side retaining ring (31b) flanking an outer edge of the drive plate (2) secure the axial position of the outer clutch when the outer clutch is open. The engine side retaining ring (31a) takes the full clutch load when clutch is closed. The gearbox-side retaining ring (31b) keeps the drive plate (2) at its axial position when opening the clutch. The layout with these retaining rings (31a, 31b), again enables assembly or dis-assembly of the drive plate (2) for shimming or repair purposes.

Shimming is a correction of the clutch travel (difference in axial position between open and closed clutch) for the dimensional tolerances of the clutch parts; the travel can be adjusted on the outer clutch (28) and the inner clutch (29) by the use of shim plates (82, 84). The shim plates can be added or taken away from the engine side of the clutch pack with ease, because the parts of the clutch to the engine side of the drive drum are not welded.

The outer clutch output drum (7) may be employed to rotationally attach and fix the outer clutch pack output side (44) to the clutch unit inner output hub (8). The attachment to the outer clutch pack output side (44) may be via a spline connection. The attachment to the clutch unit inner output hub (8) may be by a weld. The spline connection is preferably by way of an external spline connector on the outside surface of the hollow peripheral cylindrical part of the drum, and the weld connection is to the side face of the drum.

The inner clutch output drum (16) may be employed to rotationally attach and fix the inner clutch pack output side (34) to the clutch unit outer output hub (17). The attachment to the inner clutch pack output side (34) may be via a spline connection. The attachment to the clutch unit outer output hub (17) may be by a weld. The spline connection is preferably by way of an internal spline connector on the inside surface of the hollow peripheral cylindrical part of the drum, and the weld connection is to the side face of the drum.

The drive plate (2) is employed to rotationally attach and fix the clutch unit input hub (1) to the drive drum (3). The attachment to the drive drum (3) may be via one or more (e.g. two) retaining (snap) rings for axial fixation and via a spline connection for transferring torque. The attachment of drive plate (2) to the clutch unit input hub (1) may be by a welded connection.

The inner clutch end plate (10) is employed to rotationally attach and fix the oil distributor (9) to the inner clutch pack input side (32). The attachment may be via a spline connection at one or both inner and outer ends of the inner clutch end plate (10).

The stationary and sliding parts of the inner clutch pack piston are annular structures in connection with the oil distributor (9) via one or more annular seals (e.g. sliding part positioned on lip seal (56), stationary part positioned on O-ring (57)).

The sliding part of the outer clutch pack piston and the stationary part of the balancing chamber (37) of the outer clutch pack piston are annular structures in connection with the oil distributor (9) via one or more annular seals (e.g. sliding part positioned on lip seal (59), stationary part positioned on O-ring (58)). The attachment of the end of the (central) end of the drive drum side face (3b) may be attached to the oil distributor (9) using a welded connection.

Further provided is a transmission comprising the concentric double clutch as described herein.

Further provided is a use of a spring loaded bolt (62) for adjustment of axial alignment of a clutch unit inner output hub (8), a clutch unit outer output hub (17), and oil distributor (9) in a double clutch unit (100) as described herein.

Apart from fixing the axial position of the clutch in the transmission, the described assembly lay-out also ensures the preloads of the $1^{st}$ bearing (49), $2^{nd}$ bearing (39) and thrust bearing (88) or $3^{rd}$ (angular contact) bearing (19) using the spring-loaded bolt (62). The installation height of the spring is determined by the relative position of the stator and the inner drive shaft in the transmission housing.

During operation of vehicle, the clutch packs (30, 40) will want to move forwards and backwards during braking and acceleration respectively due to inertia. The forward and backwards movement of the clutch packs is to be avoided because it sets up wear mechanisms. The greater the restriction placed on axial movements of the parts, less wear mechanisms come into play.

Axial forces of the spring-loaded bolt (62) are taken up by the stator (60) which is a non-moving part. As the stator (60) is a fixed part and does not move, it will not be a source of small axial movements (play), unlike other designs that fix position of the clutch on the outer power output shaft which is axially restrained in the gearbox and there is some play. The present spring loaded bolt (62) sets up a biasing force on each of the components inner output hub (8), outer output hub (17), oil distributor (9) onto the stator (60), so that they are held against the stator (60), and are axially constrained during operation.

The clutch packs (30, 40) are radially supported by the stator (60), and are not affected by small movements of both shafts (70, 80), and hence there is a reduction of wear mechanisms in both clutches, and also in the bearing or gaps between axially aligned parts.

When the $3^{rd}$ (angular contact) bearing (19) is present, an advantage of this way of assembly is that the flange (60a) of the stator is not used for the preload of the bearings. Accordingly, there is no need for a full flange on the stator. Since the flange of the stator (60) is not used for the preload of the clutch bearing, there can be a section left out, see FIG. 2B. This enables this design to fit when the packaging space for clutch and stator is limited. Further, there is no need for additional thrust bearing between oil distributor (9) and stator flange.

Further, there is no preloading of the clutch bearings via the input hub/drive plate (2). This allows the drive plate (2) to be used as an end stop for the outer clutch. As a result, the design avoids an (disc) spring on the clutch unit input hub (1) and also avoids an additional bearing between the clutch unit inner hub clutch (8) and clutch unit input hub (1). This is also beneficial for an axially compact clutch design. Due to the absence of this bearing between clutch unit inner hub clutch (8) and clutch unit input hub (1), the thrust washer (52) avoids contact between the clutch unit inner hub clutch (8) and clutch unit input hub (1) (high differential rotational speeds).

The invention claimed is:

1. A double clutch unit for a transmission, having an engine side and a gearbox side which double clutch unit comprises:
   an outer clutch pack and an inner clutch pack, each having a clutch pack input and a clutch pack output,
   a clutch unit input hub having a hollow cylindrical part disposed with an external spline connector for attachment to a power input shaft and a flange part rotationally fixed and attached to the cylindrical part rotationally fixed to the outer clutch pack input side and the inner clutch pack input side, a clutch unit inner output hub having a hollow cylindrical part disposed with an internal spline connector for attachment to an inner power output shaft, and a flange part attached in fixed rotational relation to the outer clutch pack output side, a clutch unit outer output hub having a hollow cylindrical part disposed with an internal spline connector for attachment to an outer power output shaft, and a flange part attached in fixed rotational relation to an inner clutch pack output side, an oil distributor disposed concentrically between the inner clutch pack and the clutch unit outer output hub and rotationally fixed to the inner clutch pack input side, and a stator disposed concentrically between the oil distributor and a central axis of the double clutch unit, wherein:

the clutch unit inner power output shaft and stator are maintained in axially fixed relation, the clutch unit input hub, clutch unit inner output hub, the clutch unit outer output hub, the oil distributor are axially slidable relative to the stator, which axial sliding is constrained by a spring-loaded bolt, the spring-loaded bolt:
is attached to the engine side of the clutch unit inner power output shaft
applies an axial force in the gearbox direction to the clutch unit inner output hub, that is transmitted in order to the clutch unit outer output hub, oil distributor and ultimately to the stator, maintaining the inner output hub, clutch unit outer output hub and oil distributor in axial alignment with respect to the stator.

2. The double clutch unit according to claim 1, further comprising an oil distributor-stator bearing assembly comprising one or more bearings acting separately or in combination in a radial and axial direction disposed between the oil distributor and the stator, which assembly supports axial rotation of the oil distributor on the stator and limits axial movement of the oil distributor relative to the stator in the direction of the gearbox.

3. The double clutch unit according to claim 2, wherein the oil distributor-stator bearing assembly comprises one or more thrust bearings configured to axially support rotation and limit movement of the oil distributor relative to the stator in the direction of the gearbox, and one or more radial bearings configured to radially support rotation of the oil distributor relative to the stator.

4. The double clutch unit according to claim 1, wherein
a $1^{st}$ bearing is disposed between the flange part of clutch unit inner output hub and the flange part of the clutch unit outer output hub, wherein the $1^{st}$ bearing is a thrust bearing, and
a $2^{nd}$ bearing is disposed between a flange part of the clutch unit outer output hub and an end of oil distributor, wherein $2^{nd}$ bearing is a thrust bearing.

5. The double clutch unit according to claim 1, wherein the stator hollow cylindrical part is disposed with a plurality of outer-surface annular channels for passage of oil to the oil distributor and further comprises a stator flange rotationally and axially fixed to the end of the hollow cylindrical part at the gearbox side.

6. The double clutch unit according to claim 5 wherein the stator flange extends in a peripheral direction beyond a peripheral edge of the oil distributor only in a portion, a flange portion, of a circumference of the cylindrical part, leaving a portion, a non-flange portion of the circumference of the cylindrical part that does not extend beyond a peripheral edge of the oil distributor.

7. The double clutch unit according to claim 6, wherein the flange portion spans across more than 30-95% of the circumference of the cylindrical part.

8. The double clutch unit according to claim 1, wherein
the spring-loaded bolt comprises a bolt head, a shank and a threaded section,
the shank is positioned in between the bolt head and the threaded section,
a spring is disposed on the shank constrained by the bolt head at one end and at the other end by an adapter comprising an annular ring disposed on the shank,
compression forces generated by the spring are applied to the adapter and from the adapter to the clutch unit inner output hub.

9. The double clutch unit according to claim 8, wherein the threaded section of the bolt has a smaller diameter than that of the shank such that the inner power output shaft locks against the shank thereby fixing the compressed height of the spring.

10. The double clutch unit according to claim 1, wherein axial force generated by the spring-loaded bolt is transmitted in a direction from the engine to gearbox:
from spring-loaded bolt to clutch unit inner output hub,
from the flange part of clutch unit inner output hub to the flange part of the clutch unit outer output hub via the $1^{st}$ thrust bearing,
from the flange part of the clutch unit outer output hub to the oil distributor via the $2^{nd}$ thrust bearing, and
from the oil distributor to the stator via an oil distributor-stator bearing assembly, wherein the oil distributor-stator bearing assembly comprises one or more bearings acting separately or in combination in a radial and axial direction disposed between the oil distributor and the stator, which assembly supports axial rotation of the oil distributor on the stator and limits axial movement of the oil distributor relative to the stator in the direction of the gearbox, or the oil distributor-stator bearing assembly comprises one or more thrust bearings configured to axially support rotation and limit movement of the oil distributor relative to the stator in the direction of the gearbox, and one or more radial bearings configured to radially support rotation of the oil distributor relative to the stator.

11. The double clutch unit according claim 1, further comprising a thrust washer attached to the gear box side of the flange part of the clutch unit input hub.

12. The double clutch unit according claim 1, wherein the stator disposed concentrically between the oil distributor and the clutch unit outer output hub and/or outer power output shaft.

13. A transmission comprising a double clutch unit as claimed in claim 1.

14. The double clutch unit according to claim 1, further comprising a spring loaded bolt for maintaining axial alignment of the clutch unit inner output hub, the clutch unit outer output hub, and the oil distributor.

15. The double clutch unit according to claim 2, wherein
a $1^{st}$ bearing is disposed between the flange part of clutch unit inner output hub and the flange part of the clutch unit outer output hub, wherein the $1^{st}$ bearing is a thrust bearing, and
a $2^{nd}$ bearing is disposed between a flange part of the clutch unit outer output hub and an end of oil distributor, wherein $2^{nd}$ bearing is a thrust bearing.

16. The double clutch unit according to claim 2, wherein the stator hollow cylindrical part is disposed with a plurality of outer-surface annular channels for passage of oil to the oil distributor and further comprises a stator flange rotationally and axially fixed to the end of the hollow cylindrical part at the gearbox side.

17. The double clutch unit according to claim 16 wherein the stator flange extends in a peripheral direction beyond a peripheral edge of the oil distributor only in a portion, a flange portion, of a circumference of the cylindrical part, leaving a portion, a non-flange portion of the circumference of the cylindrical part that does not extend beyond a peripheral edge of the oil distributor.

18. The double clutch unit according to claim 17, wherein the flange portion spans across more than 30-95% of the circumference of the cylindrical part.

19. The double clutch unit according to claim 3, wherein
- a $1^{st}$ bearing is disposed between the flange part of clutch unit inner output hub and the flange part of the clutch unit outer output hub, wherein the $1^{st}$ bearing is a thrust bearing, and
- a $2^{nd}$ bearing is disposed between a flange part of the clutch unit outer output hub and an end of oil distributor, wherein $2^{nd}$ bearing is a thrust bearing.

20. The double clutch unit according to claim 19, wherein the stator hollow cylindrical part is disposed with a plurality of outer-surface annular channels for passage of oil to the oil distributor and further comprises a stator flange rotationally and axially fixed to the end of the hollow cylindrical part at the gearbox side.

\* \* \* \* \*